US007016577B2

(12) United States Patent
He

(10) Patent No.: US 7,016,577 B2
(45) Date of Patent: Mar. 21, 2006

(54) MULTI-COLORED ELECTROLUMINESCENT FILAMENT AND METHOD FOR MANUFACTURING THE SAME

(76) Inventor: Wenzheng He, No. 1706 High Technology Building, No. 229 North Si Huan Zhong Road, Beijing, 100083 (CN)

( * ) Notice: Subject to any disclaimer, the term of this patent is extended or adjusted under 35 U.S.C. 154(b) by 126 days.

(21) Appl. No.: 10/733,530

(22) Filed: Dec. 10, 2003

(65) Prior Publication Data

US 2004/0145313 A1 Jul. 29, 2004

Related U.S. Application Data

(63) Continuation of application No. PCT/CN03/00662, filed on Aug. 13, 2003.

(30) Foreign Application Priority Data

Jan. 29, 2003 (CN) .............................. 03236892 U

(51) Int. Cl.
*G02B 6/44* (2006.01)
*H01J 1/62* (2006.01)
*H01J 63/04* (2006.01)

(52) U.S. Cl. ...................... 385/104; 385/102; 385/103; 385/101; 385/100; 313/483; 313/494; 313/484; 313/486; 313/487

(58) Field of Classification Search ................. 385/104
See application file for complete search history.

(56) References Cited

U.S. PATENT DOCUMENTS 5,485,355 A * 1/1996 Voskoboinik et al. ......... 362/84
5,753,381 A * 5/1998 Feldman et al. ............ 428/696
5,869,930 A * 2/1999 Baumberg et al. .......... 313/506
6,329,083 B1 * 12/2001 Toguchi et al. ............. 428/690

FOREIGN PATENT DOCUMENTS

CN 1350416 A 5/2002
CN 2523165 Y 11/2002
JP 07-235375 9/1995

* cited by examiner

*Primary Examiner*—Frank G. Font
*Assistant Examiner*—Ryan Lepisto

(57) ABSTRACT

The present invention relates to an electroluminescent filament capable of emitting a plurality of colors and a method for manufacturing the same. Said electroluminescent filament of the present application comprises: A metal conductive wire as core wire; A medium insulating layer coated on the core wire; A light emitting layer coated on the medium insulating layer; A conductive layer coated on the light emitting layer; At least one or more transmission conductive wires wound at interval on the outside of the conductive layer; The transparent polymer casing tube covering the transmission conductive wires and the outer side of the surface of conductive layer not covered by transmission conductive wires; The polymer casing tube of at least 2 to 8 colors covering the outer layer of transparent polymer casing tube and forming light emitting filament with helical or sectional colors combination. The electroluminescent filament of the present invention is low in power consumption, free from heating and cannot be abnormally switched off, and has relatively long service life. Being extraordinarily extensive in its scope of application, the present invention can be used for external and internal housing and automobile decoration, and for external decoration for the purpose of advertisement, in entertainment places, and for toys, art and handicraft products and electric and electronic equipment.

9 Claims, 6 Drawing Sheets

MULTI-COLORED ELECTROLUMINESCENT FILAMENT AND METHOD FOR MANUFACTURING THE SAME

CROSS-REFERENCE TO RELATED APPLICATIONS

This application is a continuation of international application No. PCT/CN03/00662 filed on Aug. 13, 2003.

BACKGROUND OF THE INVENTION (1) Field of the Invention

The present invention relates to an electroluminescent light source. In particular, it relates to an electroluminescent filament capable of emitting a plurality of colors and a method and a device for manufacturing the same.

(2) Description of the Related Art

The conventional cable-like light emitting device mainly comprises: Neo light, with fragile glass outer layer, dangerous factors of high voltage and high frequency and incapability of being readily shaped, has the drawbacks of high power consumption and high cost for manufacture and maintenance. The colored incandescent light using filament to emit incandescent light and colored lamp-cover to achieve colored light effect consists of a plurality of small incandescent bulb or light emitting diode (LED); This kind of color tube is of substantial diameter and its diameter of lattice light filament is 10 mm or more, and it is power-consuming, with its freedom of shaping being restricted by the large diameter and rigidity. The further drawbacks of said two devices lie in low efficiency in light emission, proneness to conductive wire damage and likelihood to cause fatal accidents when used in rainy weather.

Still another electroluminescent light source also has its deficiency. For example, the technical solution disclosed in the Patent No. CN1101125C and U.S. Pat. No. 5,869,930 relates to a mono-color light source using solvent to dilute the substance of electrolytic layers, making it loosely organized and producing a lot of blowholes and pores, which should be filled in with transparent substance for continuous light emission. The process is complex, and because transparent filler does not have a long, effective conductivity such that this kind of light source is apt to lose its function, the light emission can not last long, nor can the light be emitted evenly.

SUMMARY OF THE INVENTION

One of the objects of the present invention is to overcome the drawbacks of the prior art and to provide an electroluminescent filament, low in electricity consumption, convenient to use and capable of emitting multiple colors and bright light, and a method and device for manufacturing the same.

In the process of the electroluminescent filament of the present invention, there is no need to use solvent to dilute the substance of each electrolytic layer in the light source. Since the present invention uses a squeezing coreless automatic orientation device which increases the structural density of the mixture of the layers of the present light-emitting filament, improves light emission efficiency and makes it unnecessary to use any transparent filler.

The multi-colored, helical or sectional electroluminescent filament manufactured by the device of the present invention, through the polymer placed on the out layer of the filament and composed of different colors, shows a plurality of colors which are helical or sectional shape.

According to the present invention, there is provided a multi-colored electroluminescent filament, comprising:

A. A metal conductive wire as a core wire to be used as an electrode;

B. On the outer layer of the core wire is used a coreless orientation squeezing automatic device to coat the insulating mixture of increased density as a medium insulating layer after squeezing on the circumference of the core wire;

C. The coreless orientation squeezing automatic device is also used on the medium insulating layer to coat the light emitting mixture of increased density as a light emitting layer after squeeze on the circumference of the insulating layer;

D. The coreless orientation squeezing automatic device is also used on the light emitting layer to coat the squeezed conductive mixture on the circumference of the light emitting layer to form a conductive layer;

E. Around the outside layer of the conductive layer is wound, at interval, with at least one or more transmission conductive wire, which is led out as the other electrode;

F. A transparent or color polymer casing tube covers the two transmission conductive wires and the outer side of the surface of the conductive layer that is not covered by the transmission conductive wires;

G. A polymer casing tube of different color is provided to cover the outer layer of a transparent or color polymer casing tube, its colors being in a helical or sectional pattern and it being in a filament form capable of simultaneously at least 2 to 8 colored lights, wherein:

Said transparent polymer casing tube is a protective layer protecting the transmission conductive wire from being broken and having a diameter ranging from 0.5 to 3 mm.

The diameter of said filament is in a range of 0.8 and 10 mm.

Said core wire, a metal wire of a diameter ranging from 0.1 to 1 mm, leads out an electrode.

Said transmission conductive wires have at least one or more metal conductive wires that are highly conductive, specially treated and not easy to break; said metal conductive wires winds, at interval, round the outer side of the conductive layer and are led out as the other electrode. Said transmission conductive wires may have a diameter in the range of 0.04 and 0.12 mm.

Said medium insulating layer is a mixture coat of flexible binder having cyanoethyl as its base and $BaTiO3$ powder, with its preferred thickness ranging from 25 $\mu$m to 60 $\mu$m.

Said light-emitting layer is a mixture coat of flexible binder having cyanoethyl as its base and luminescent phosphorus powder, with its preferred thickness ranging from 25 $\mu$m to 60 $\mu$m.

Said conductive layer is a semi-transparent, highly conductive semi-solid viscous conductive substance, with its preferred thickness of 0.05 mm or less.

The preferred thickness of said three coats of the present invention is the result of a lot of experiments made by the present inventor, and has overcome the drawbacks of the electroluminescent filament of the prior art. The present inventor has concluded from much experimentation that where the input power supply is of an equivalent parameter, the thickness of the medium insulating layer and light emitting layer has a direct effect on the light emission and bend resistance of the light-emitting filament. If the thickness exceeds 60 $\mu$m, the light emitted by the light-emitting filament will be dimmer. More importantly, when the light-emitting filament bends, the internal organization, under the impact of the internal bending force, is broken after being increasingly compressed along with the decreasing of the diameter of the bending, which would result in short circuit of the light-emitting filament or break the medium insulating player and the light emitting layer, thus disabling the light emission or causing partial non-light-emission of the light emitting filament.

Said coreless orientation squeezing automatic device is the most important device used in the production line for manufacturing the light emitting filament, mainly comprising the following members: two sets of rotary fixed wheels in the front and rare, air-tight box having an air pressure device, a spherical fixing-center-member, outer ring of the spherical fixing-center-member, sealing ring, pressure valve of the spherical fixing-center-member and dry box.

Said device for covering polymer of a plurality of colors mainly comprises following members: a plurality of fixed leading wheels, cooling groove, traction wheel sets, multi-heating-path mould head, moving contactor, electric motor, speed-regulating wheel sets, control wires, program control stand, composite wheel disk and squeezing machine set having an electric motor on the composite wheel disk.

After AC power supply having a voltage ranging from 50 to 300V and frequency ranging from 200 to 10000 HZ is input, the present invention is a multi-colored, helical or sectional light-emitting filament capable of being bent into a variety of shape and emitting at least 2 to 8 different colors.

DETAILED DESCRIPTION OF THE PREFERRED EMBODIMENTS

The present invention will now be further described in connection with the illustrative figures of the description and embodiments so that it may be more fully understood.

Figure 1:
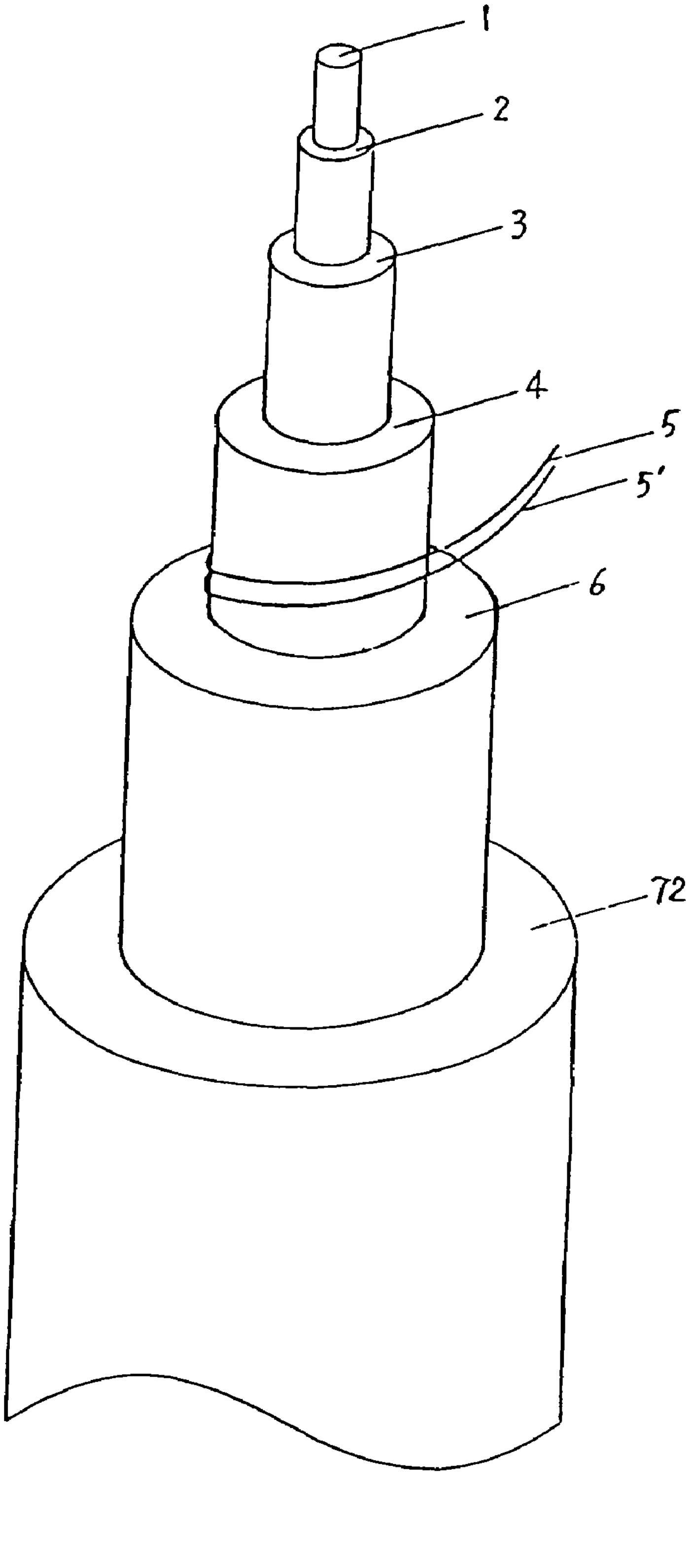
FIG. 1 is a schematic diagram illustrating the structure of the present invention.
Figure 2:
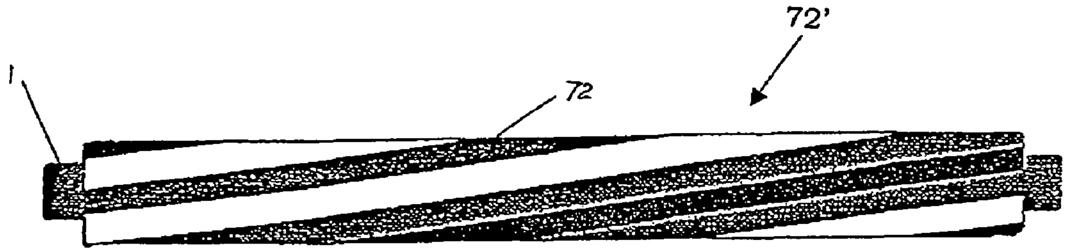
FIG. 2 is a three-dimensional schematic diagram illustrating the structure of the first embodiment of the present invention.

Embodiment 1:

As illustrated in FIGS. 1 and 2, a multi-colored electroluminescent filament with helical colors combination, comprising:

A. A metal conductive wire as core wire 1;

B. A medium insulating layer 2 coated on the core wire 1;

C. A light emitting layer 3 coated on the medium insulating layer 2;

D. A conductive layer 4 coated on the light emitting layer 3;

E. Two transmission conductive wires 5, 5' wound at interval on the conductive layer 4;

F. A transparent polymer casing tube 6 or a color polymer casing tube 71 disposed on the transmission conductive wires 5, 5' and the outer side of the surface of conductive layer 4 not covered by transmission conductive wires 5, 5';

G. A polymer casing tube 72 of at least 2 to 8 colors disposed on the transparent polymer casing tube 6 or the color polymer casing tube 71, functioning as an overall cover and protection of the light emitting filament, in addition, it is disposed on the outmost layer of the filament and forms a colorful, bright light emitting filament 72' through the helical extension of the different colors, wherein:

Core wire 1, a metal wire of a diameter 0.5 mm, is led out as an electrode.

Said medium insulating layer is a mixture coat of flexible binder having cyanoethyl as its base and BaTiO3 powder, with a preferred thickness of 0.035 mm.

Said light-emitting layer 3 is a mixture coat of flexible binder having cyanoethyl as its base and light emitting phosphorus powder, with a preferred thickness of 0.035 mm.

Said conductive layer 4 is a semi-transparent, highly conductive semi-solid viscous conductive substance, with a preferred thickness of 0.05 mm or less.

Said transmission conductive wires 5, 5' are two metal conductive wires having a diameter of 0.06 mm that are highly conductive, specially treated and not easy to break; the two metal wires wind, at interval, round the outer side of the conductive layer 4 and are led out as the other electrode.

Transparent polymer casing tube 6 is a protective layer to protect transmission conductive wire 5, 5' from being broken.

Figure 6:
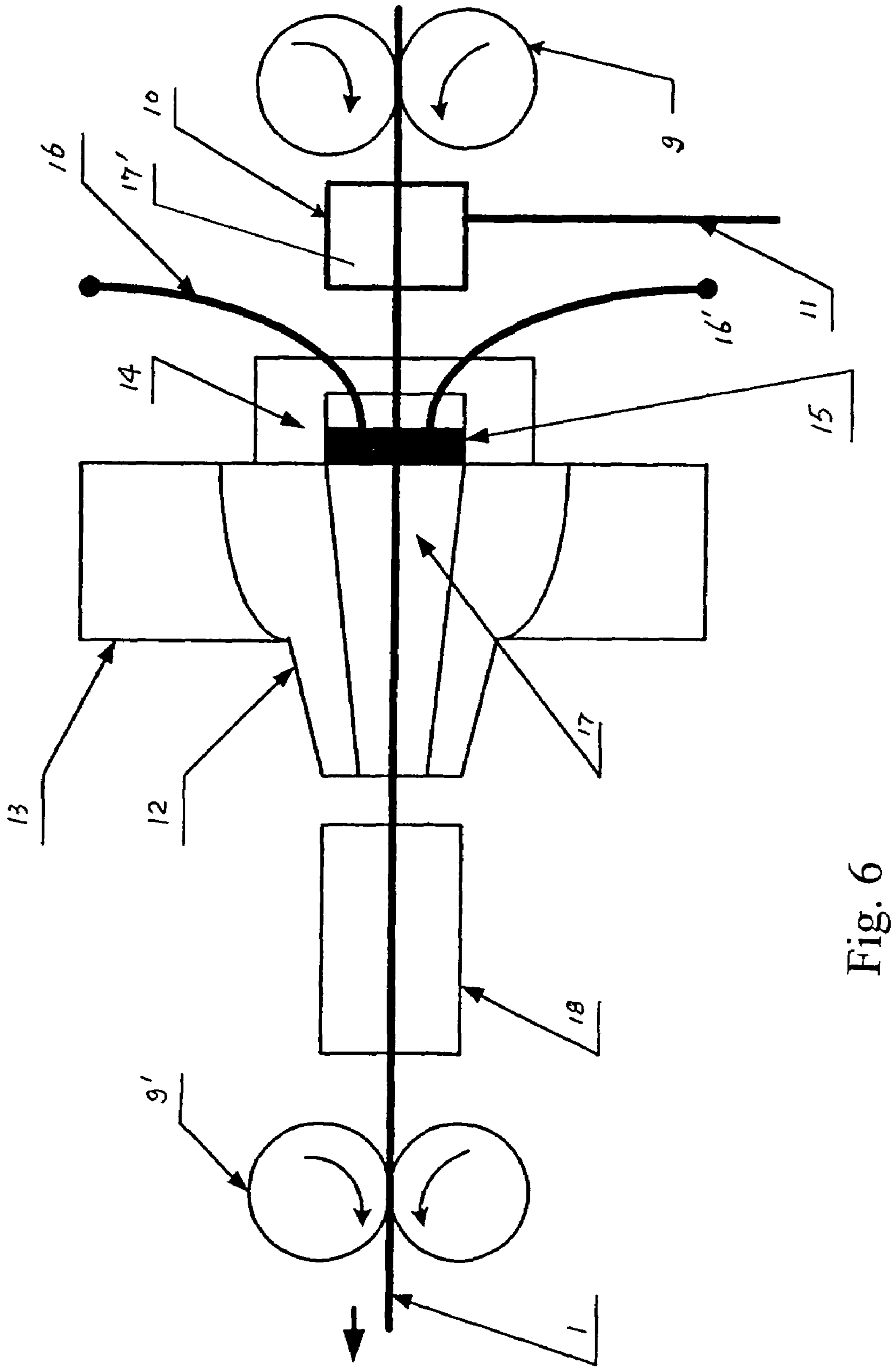
FIG. 6 is a schematic diagram illustrating the coreless orientation squeezing automatic devise of the present invention.

As shown in FIG. 6, the coreless orientation squeezing automatic device is a production line, mainly comprising: two sets of rotary fixed wheels 9, 9' in the front and rare, air-tight box having an air pressure device 10, mixture material 17' contained in the box, air-pressure device tube 11, a spherical fixing-center-member 12, outer ring 13 of the spherical fixing-center-member, sealing ring 14, pressure valve 15 of the spherical fixing-center-member, air-pressure device tube of preasure valve 16, 16', mixture material 17 in the spherical fixing-center-member 12 and a dry box 18.

Figure 4:
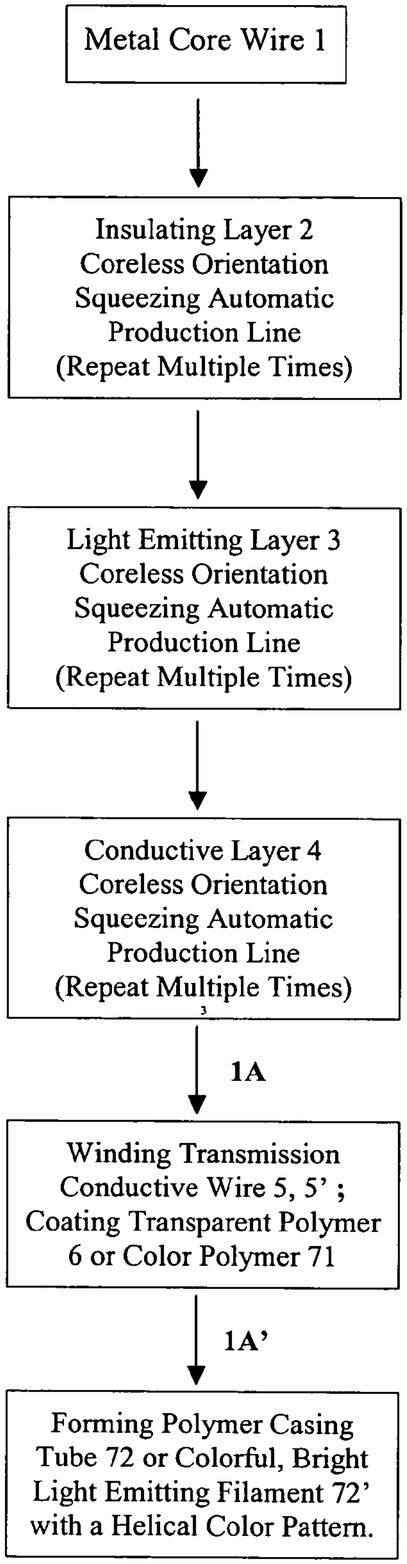
FIG. 4 is a flow chart showing the process of the present invention for manufacturing light-emitting filament with helical colors combination.

As shown in FIG. 4, the process flow for manufacturing the electroluminescent filament with the helical colors combination comprises the following steps:

A. a copper wire having a diameter of 0.5 mm, as a central electrode core wire 1 is placed at the central position of the coreless orientation squeezing automatic device;

B. forming insulating layer 2: mixture coat of flexible binder having cyanoethyl as its base and BaTiO3 powder is put in the coreless orientation squeezing automatic device and is coated a plurality of times on the central electrode core wire 1;

C. forming light-emitting layer 3: mixture coat of flexible binder having cyanoethyl as its base and light emitting phosphorous powder is placed in the coreless orientation squeezing automatic device and is coated a plurality of times on the insulating layer 2 of the central electrode core wire 1;

D. forming conductive layer 4: a semi-transparent, highly conductive semi-solid viscous conductive substance is put in the coreless orientation squeezing automatic device and is coated a plurality of times on the light emitting layer 3.

E. winding transmission conductive wire 5;

F. coating transparent or color polymer to form a transparent polymer casing tube 6 or color polymer casing tube 71 with automatic production line;

G. forming the polymer casing tube with helical colors combination 72: the device for coating polymer of a plurality of colors is used to form a continuous, helical, multi-colored cable-like filament 72', wherein the manufacture of the three coat layers inside the filament, i.e., insulating layer, light emitting layer and conductive layer, is completed continually with the production line comprising three sets of coreless orientation squeezing automatic devices. The structure of each of the insulating layer, light emitting layer and conductive layer requires two-to-five-recycling process to ensure their exact and even thickness.

As shown in FIG. 6, the process for initial material feeding of the filament is as follows:

The core wire 1 is dynamically hauled; keep moving horizontally along the direction indicated by the arrow under the guide of the rotary fixed wheels 9, 9' into and through air-tight box 10 to complete the initial material feeding process. The process is that: inside air-tight box 10 is mixture material 17'; air-tight box 10 is connected to air pressure pipeline 11; mixture material 17' is compressed under the pressure of the air-pressure device to increase its density and when core wire 1 runs through air-tight box 10 under the effect of traction, core wire 1, under the pressure, is attached on its surface mixture material 17' of high density.

Second material feeding process of filament:

Acted upon by the dynamic traction wheel group 9' at the rare end, core wire 1 that has completed the initial material feeding moves on into spherical fixing-center-member 12; said spherical fixing-center-member 12 is a semi-spherical body made of special material, with its central hole large at its entrance and narrow at its exit which is slightly larger than core wire 1, with one end of bigger aperture being placed air-pressure valve 15 and sealing ring 14 and air-pressure device tube of pressure valve 16, 16'; when core wire 1 is coated with material of enhanced density during the first feeding of material, its size is not accurate, and it is not dry, but viscous. It, under the effect of dynamic traction, goes into spherical fixing-center-member 12, is combined with mixture 17 in the tapered inner cavity of spherical fixing-center-member 12, and the density of the mixture is further enhanced under the effect of air pressure; core wire 1 keeps on moving under the effect of traction, core wire 1 is led out from the small end of the aperture of spherical fixing-center-member 12, jointly acted upon by spherical fixing-center-member 12 and pressure valve 15, the surface of core wire 1 is evenly coated with mixture material 17; then core wire 1 goes into dry box 18 to be dried so as to achieve the thickness as required by each process; the surface of contact between spherical fixing-center-member 12 and outer ring 13 of spherical fixing-center-member will be smooth for easy sliding, which greatly helps to get the even coat.

Having gone through said process of coating insulating layer 2, light emitting layer 3 and conductive layer 4, core wire 1 forms wire 1A.

As shown in FIGS. 1 and 4, wire 1A then goes through the process to be wound round with transmission conductive wire 5 and coated with transparent polymer tube 6: at the front end of the mould head for discharging material and a polymer squeezing machine, a device (which is not shown in the figures and is a known technology) which can be rotary and lead in two conductive wires 5, 5' is arranged, the rotary power winds the wires around wire 1A, after being wound, it enters the mould head for discharging material, being subject to the traction of the squeezing machine, while winding the transmission conductive wire, it is covered with the transparent polymer casing tube to form wire 1A'.

Figure 7:
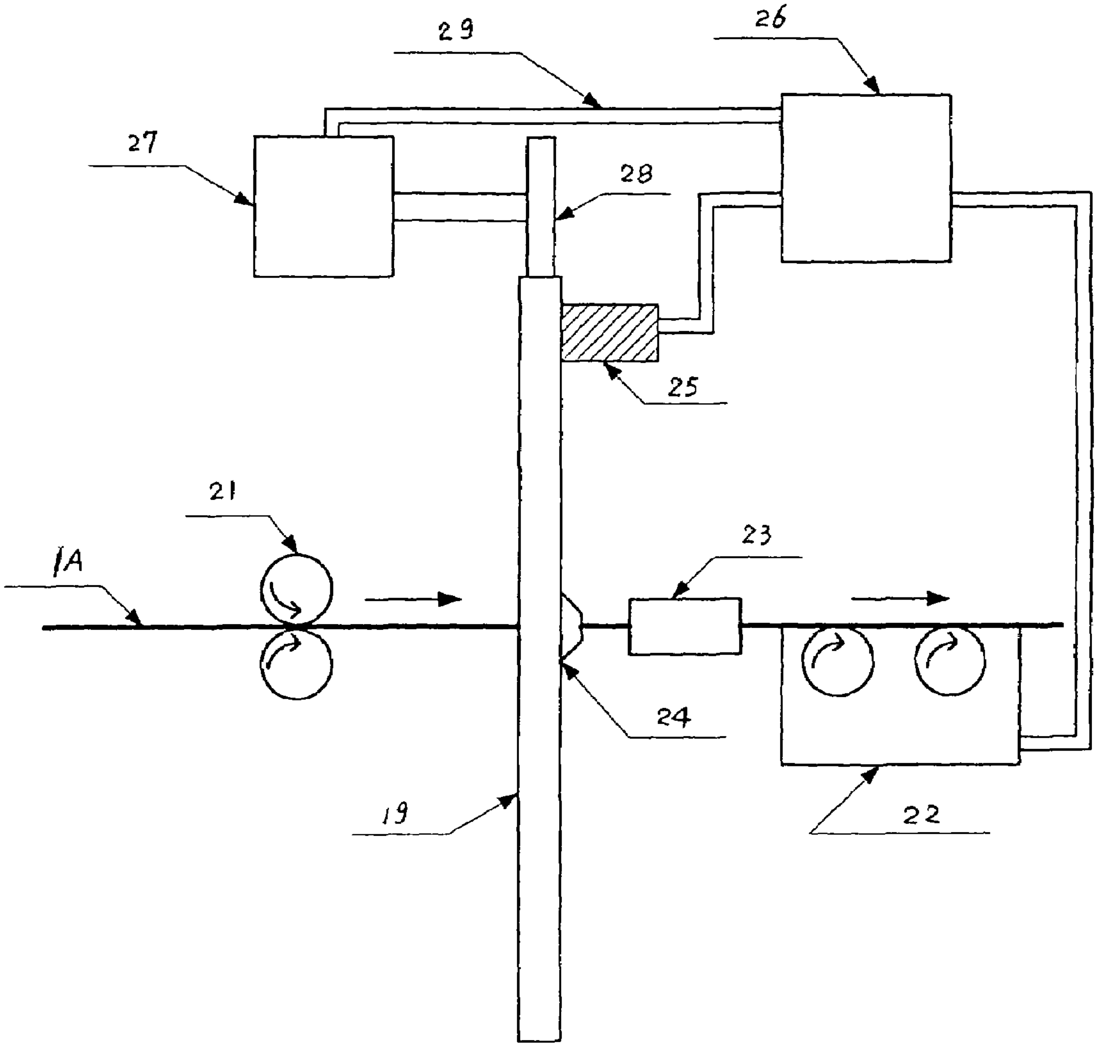
FIG. 7 is a schematic diagram illustrating the structure of the device of the present invention for coating polymer of a plurality of colors.
Figure 8:
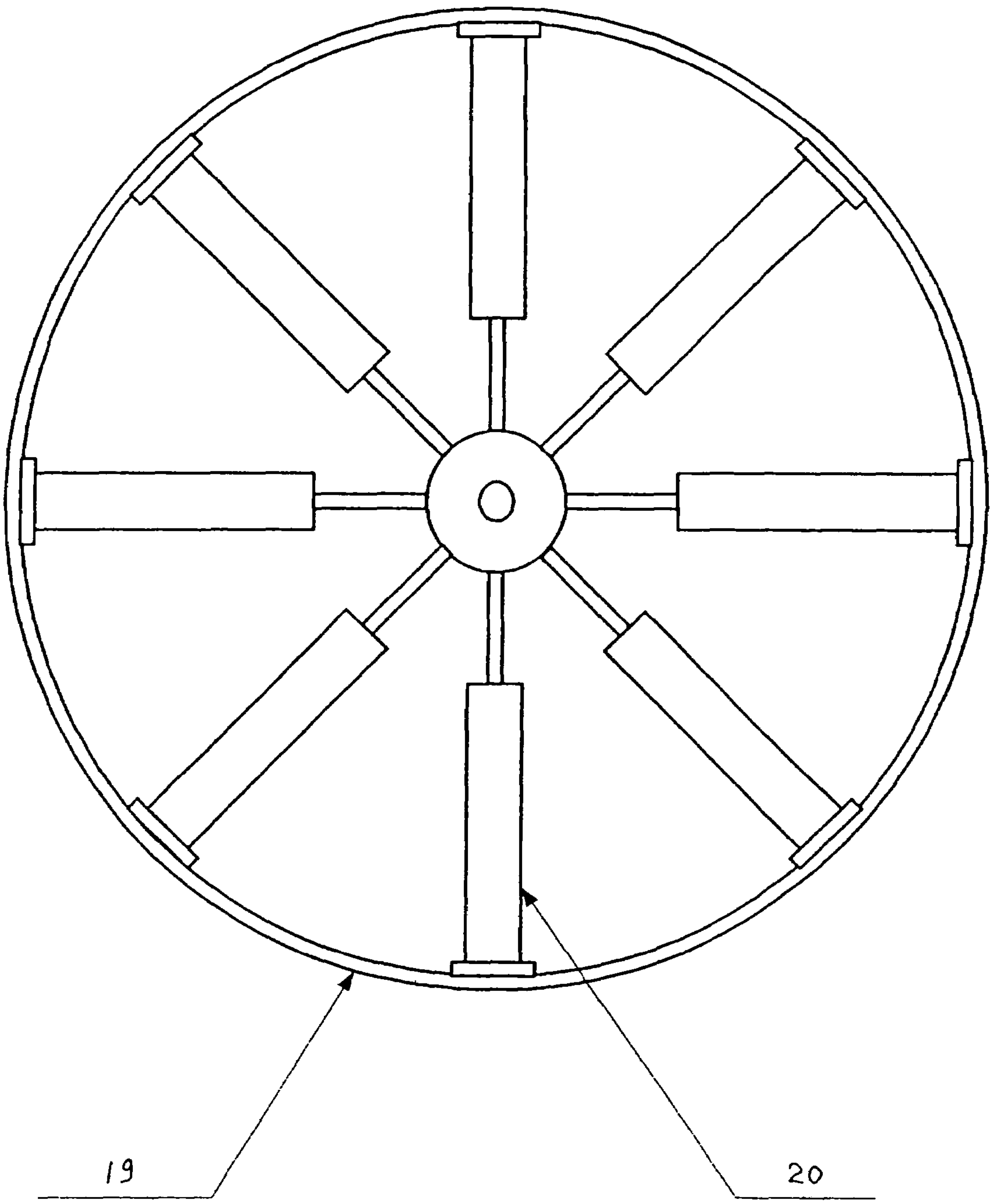
FIG. 8 is a schematic diagram illustrating the structure of the composite wheel disk of the present invention for coating polymer of a plurality of colors.

As shown in FIGS. 7 and 8, the device for covering multi-colored polymer casing tube mainly comprises the following members: material squeezing machine set 20 having an electric motor on the composite wheel disks 19, several sets of fixed leading wheels 21, traction wheel set 22, cooling groove 23, multi-heating-path mould head 24, eight-channel moving contactor 25, program control stand 26, electric motor 27, speed-regulating wheel sets 28, control wire 29.

As shown in FIGS. 4, 7 and 8, the process of the present invention for manufacturing helical, multi-colored polymer layer is as follows: after wire 1A' is prepared, the eight sets of material squeezing machines 20 on the composite wheel disk 19 are pre-heated to an appropriate temperature, program control stand 26 initiates the rotation of traction wheel set 22 through control wire 29; wire 1A, controlled by fixed leading wheel 21, goes through composite wheel disk 19, multi-heating-path mould head 24 and cooling groove 23 and moves in the direction indicated by the arrow; then, electric motor 27 is turned on through program control stand 26 and control wire 29 to activate the interlocking rotation of speed-regulating wheel set 28 and composite wheel disk 19, and program control stand 26 starts, through control wire 29, eight-channel moving contactor 25 and eight sets of material squeezing machine 20 on composite wheel disk 19; in the meantime, multi-colored polymer is squeezed out from different angles, and simultaneously discharged through multi-heating-path mould head 24 to cause it to surround wire 1A', when wire 1A' moves straight and composite wheel disk 19 rotates, a continuous, helical, multi-colored polymer layer is formed around wire 1A', and immediately goes into cooling groove 23 for cooling; after cooling, it forms a multi-colored filament with helical colors pattern 72'.

Figure 3:
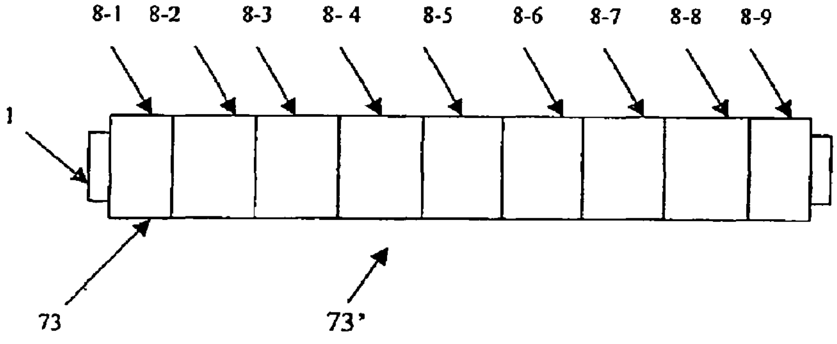
FIG. 3 is a three-dimensional schematic diagram illustrating the structure of the second embodiment of the present invention.

Embodiment 2:

As illustrated in FIGS. 1 and 3, a multi-colored electroluminescent filament with sectional colors combination, comprising:

A. A metal conductive wire as core wire 1;

B. A medium insulating layer 2 coated on the core wire 1;

C. A light emitting layer 3 coated on the medium insulating layer 2;

D. A conductive layer 4 coated on the outer layer of light emitting layer 3;

E. Two transmission conductive wires 5, 5' wound at interval on the conductive layer 4;

F. A transparent polymer casing tube 6 or a color polymer casing tube 71 disposed on the transmission conductive wires 5, 5' and the outer side of the surface of conductive layer 4 not covered by transmission conductive wires 5, 5';

G. A polymer casing tube 73 of at least 2 to 8 colors disposed on the transparent polymer casing tube 6 or the color polymer casing tube 71, i.e., the outmost layer of the filament, functioning as an overall cover and protection of the light emitting filament and its sections 8-1~8-8 forming a colorful, sectional emitting filament 73'(for example, the color of 8-1 is yellow, the color of 8-2 is red, the color of 8-3 is green, etc.), wherein:

Core wire 1, a metal wire having a diameter of 0.8 mm, is led out as an electrode.

Said medium insulating layer is a mixture coat of flexible binder having cyanoethyl as its base and BaTiO3 powder, with a preferred thickness of 50 μm.

Said light-emitting layer is a mixture coat of flexible binder having cyanoethyl as its base and light emitting phosphorus powder, with a preferred thickness of 50 μm.

Said conductive layer 4 is a semi-transparent, highly conductive, semi-solid viscous conductive substance, with a preferred thickness of 0.04 mm or less.

Said transmission conductive wires 5, 5' are two metal conductive wires having a diameter of 0.12 mm that are highly conductive, specially treated and not easy to break; the two metal wires wind, at interval, round the outer side of the conductive layer 4 and led out as the other electrode.

Transparent polymer casing tube 6 is a protective layer to protect transmission conductive wire 5 from being broken.

The length of the different color in each section of filament 73' is 1~200 cm.

Figure 5:
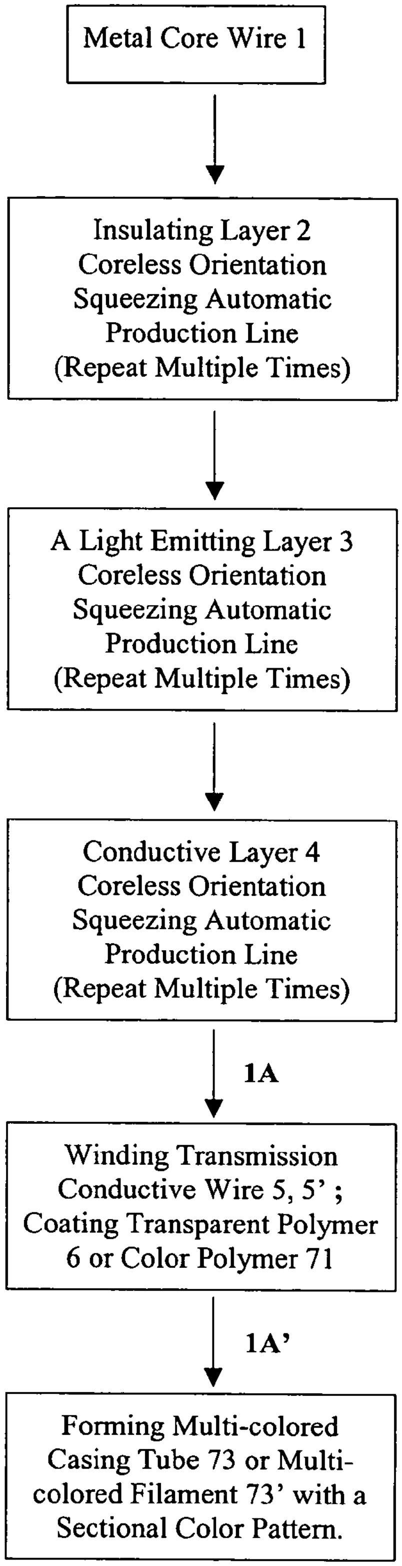
FIG. 5 is a flow chart showing the process of the present invention for manufacturing light-emitting filament with sectional colors combination.

As shown in FIG. 5, the process flow of the present invention for manufacturing multi-colored electroluminescent filament with sectional colors combination comprises the following steps:

A. A copper wire having a diameter of 0.8 mm, as a central electrode core wire 1, is placed at the central position of the coreless orientation squeezing automatic device;

B. Forming insulating layer 2: mixture coat of flexible binder having cyanoethyl as its base and BaTiO3 powder is put in the coreless orientation squeezing automatic device and is coated a plurality of times on the core wire 1;

C. forming light-emitting layer 3: mixture coat of flexible binder having cyanoethyl as its base and light emitting phosphorous powder is placed in the coreless orientation squeezing automatic device and is coated a plurality of times on the insulating layer 2 of the core wire 1;

D. forming conductive layer 4: a semi-transparent, highly conductive semi-solid viscous conductive substance is put in the coreless orientation squeezing automatic device and is coated a plurality of times on the light emitting layer 3.

E. winding transmission conductive wire 5, 5';

F. covering transparent polymer casing tube 6 or color polymer casing tube 71 with automatic production line;

G. forming the multi-colored casing tube 73 with sectional colors combination: the device for coating polymer of a plurality of colors is used to form a continuously sectional, multi-colored filament 73', wherein the manufacture of the three coat layers inside the filament, i.e., insulating layer, light emitting layer and conductive layer, is completed continually with the production line comprising three sets of coreless orientation squeezing automatic devices. The structure of each of the insulating layer, light emitting layer and conductive layer requires two-to-five-recycling process to ensure their exact and even thickness.

The squeezing-type coreless automatic orientation device and process A~F for multiple-coats of material are identical with the process for coating material a plurality of times as illustrated in embodiment 1; hence, it is not elaborated here.

The device of the present invention for coating multi-colored polymer with sectional colors combination is identical with embodiment 1.

As shown in FIGS. 5, 7 and 8, the process for manufacturing multi-colored polymer layer with sectional colors combination is as follows:

When wire 1A' is prepared, squeezing machine sets 20 are heated to an appropriate temperature; control wire 29 initiates, through program control stand 26, the rotation of traction wheel set 22; wire 1A', controlled by fixed leading wheel 21, goes through composite wheel disk 19, multi-heating-path mould head 24, cooling groove 23 and moves in the direction indicated by the arrow; then program control stand 26 starts eight-channel moving contactor 25 and a certain set of material squeezing machine 20 on composite wheel disk 19 through control wire 29; a certain color polymer is squeezed out from multi-heating-path mould head 24, to surround wire 1A'; when a certain quantities of polymer is squeezed out, program control stand 26 orders said squeezing machine 20 to stop working through control wire 29, and meanwhile orders the next squeezing machine to initiate its operation and discharge polymer of another color; The polymer of the two colors connect each other; if it goes on like this, it is possible to discharge polymer of different colors, which is attached to wire 1A' after being discharged from multi-heating-path mould head 24; and immediately goes into cooling groove 23; after the cooling, it forms a continuously sectional and multi-colored filament 73'.

INDUSTRIAL APPLICABILITY

The electroluminescent filament of the present invention is low in power consumption, free from heating and cannot be abnormally switched off, and has relatively long service life, with 4000-hour lighting time. The filament can be bent into a plurality of geometrical shapes as consumers demand, and it is beautiful and appealing, with a plurality of colors to choose from. Besides, being extraordinarily extensive in its scope of application, the present invention can be used for external and internal housing and automobile decoration, and for external decoration for the purpose of advertisement, in entertainment places, and for toys, art and handicraft products and electric and electronic equipment.

We claim:

1. A multi-colored electroluminescent filament, comprising:

a metal conductive wire as a core wire;

a medium insulating layer coated on the core wire, wherein said medium insulating layer is a mixture coat of flexible binder having cyanoethyl as its base and BaTiO3 powder with a thickness of 25 μm to 60 μm;

a light emitting layer coated on the medium insulating layer;

a conductive layer coated on the light emitting layer;

one or more transmission conductive wires wound at interval on the conductive layer;

a transparent polymer casing tube or a color polymer casing tube disposed on the transmission conductive wires and an outer surface of the conductive layer.

2. The electroluminescent filament according to claim 1, wherein said core wire is a metal wire having a diameter ranging from 0.1 to 1 mm, and is led out as an electrode.

3. The electroluminescent filament according to claim 1, wherein said transmission conductive wires have a diameter of 0.06 to 0.12 mm.

4. The electroluminescent filament according to claim 1, further comprising a polymer casing tube with a helical color pattern disposed on the transparent polymer casing tube or the color polymer casing tube, wherein said polymer casing tube has a diameter ranging from 0.5 to 3 mm.

5. The electroluminescent filament according to claim 1, wherein said filament has a diameter ranging from 1 to 10 mm.

6. The electroluminescent filament according to claim 1, wherein said light emitting layer is a mixture coat of flexible binder having cyanoethyl as its base and light emitting phosphorus powder, with a thickness of 25 $\mu$m to 60 $\mu$m.

7. The electroluminescent filament according to claim 1, wherein said conductive layer is a semi-transparent, highly conductive, semi-solid viscous conductive substance with the a thickness of 0.05 mm or less.

8. The electroluminescent filament according to claim 1, wherein said transmission conductive wires are at least one or more metal wires which are highly conductive and not easy to break; said metal wires wind, at interval, round the outer side of the conductive layer and is led out as an electrode.

9. The electroluminescent filament according to claim 1, further comprising a polymer casing tube with a sectional color pattern disposed on the transparent polymer casing tube or the color polymer casing tube, wherein said polymer casing tube has a diameter ranging from 0.5 to 3 mm.

* * * * *